United States Patent
Wan et al.

(10) Patent No.: US 10,278,085 B2
(45) Date of Patent: Apr. 30, 2019

(54) METHOD AND APPARATUS FOR COMMUNICATING TO UE AN INDICATION OF AVAILABLE RS, BASED ON MIMO MODE SETTINGS

(71) Applicant: Telefonaktiebolaget LM Ericsson (publ), Stockholm (SE)

(72) Inventors: Lei Wan, Beijing (CN); David Astely, Bromma (SE); Muhammad Kazmi, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/607,010

(22) Filed: May 26, 2017

(65) Prior Publication Data
US 2017/0265093 A1 Sep. 14, 2017

Related U.S. Application Data

(63) Continuation of application No. 14/540,780, filed on Nov. 13, 2014, now Pat. No. 9,693,247, which is a
(Continued)

(51) Int. Cl.
*H04W 24/08* (2009.01)
*H04J 11/00* (2006.01)
(Continued)

(52) U.S. Cl.
CPC ......... *H04W 24/08* (2013.01); *H04B 7/0413* (2013.01); *H04J 11/0093* (2013.01);
(Continued)

(58) Field of Classification Search
None
See application file for complete search history.

(56) References Cited

U.S. PATENT DOCUMENTS 8,917,696 B2 12/2014 Wan et al.
2007/0009016 A1 1/2007 Tsutsui
(Continued)

FOREIGN PATENT DOCUMENTS

EP 1619847 A2 1/2006
WO 2009012350 A1 1/2009

OTHER PUBLICATIONS

Nortel Networks. "Dedicated RS Arrangements for E-UTRA Downlink." 3GPP TSG-RAN Working Group 1 Meeting #49, R1-072385, Kobe, Japan, May 7-11, 2007, pp. 1-4.
(Continued)

*Primary Examiner* — Donald L Mills
(74) *Attorney, Agent, or Firm* — Coats & Bennett, PLLC

(57) ABSTRACT

The present solution ensures that the UEs are able to make use of all the available reference signals that can be used in a cell for performing UE measurements, estimations or demodulations. That is achieved by indicating on a downlink common or shared channel, the MIMO mode settings associated with a specific network node. The indicated MIMO mode settings explicitly or implicitly indicate available common reference signals and/or dedicated reference signals to be used for said UE measurements, estimations or demodulations, which implies that measurements, estimations or demodulations can be performed based on said received indication.

29 Claims, 4 Drawing Sheets

Related U.S. Application Data continuation of application No. 12/867,494, filed as application No. PCT/SE2009/050084 on Jan. 28, 2009, now Pat. No. 8,917,696.

(60) Provisional application No. 61/028,662, filed on Feb. 14, 2008.

(51) Int. Cl.
*H04L 5/00* (2006.01)
*H04B 7/0413* (2017.01)
*H04B 7/06* (2006.01)

(52) U.S. Cl.
CPC ............ *H04L 5/005* (2013.01); *H04L 5/0007* (2013.01); *H04L 5/0053* (2013.01); *H04B 7/0617* (2013.01)

(56) References Cited

U.S. PATENT DOCUMENTS

| | | |
|---|---|---|
| 2007/0171849 A1 | 7/2007 | Zhang et al. |
| 2007/0254658 A1 | 11/2007 | Fabien et al. |
| 2008/0101269 A1 | 5/2008 | Jung et al. |
| 2008/0212550 A1 | 9/2008 | Han et al. |
| 2008/0212701 A1 | 9/2008 | Pan et al. |
| 2008/0225960 A1 | 9/2008 | Kotecha et al. |
| 2008/0225993 A1 | 9/2008 | Malladi et al. |
| 2008/0310396 A1 | 12/2008 | Park et al. |
| 2009/0316802 A1 | 12/2009 | Tong et al. |
| 2010/0003979 A1 | 1/2010 | Iwamura et al. |
| 2015/0215921 A1 | 7/2015 | Zhang et al. |

OTHER PUBLICATIONS

Catt. "Downlink dedicated reference signal structure for adaptive beam-forming in EUTRA TDD." 3GPP TSG RAB WG1 Meeting #47, R1-063286, Riga, Latvia, Nov. 6-10, 2006, pp. 1-4.

METHOD AND APPARATUS FOR COMMUNICATING TO UE AN INDICATION OF AVAILABLE RS, BASED ON MIMO MODE SETTINGS

RELATED APPLICATION

This application is a continuation of U.S. application Ser. No. 14/540,780, filed Nov. 13, 2014, which is a continuation of U.S. application Ser. No. 12/867,494, filed Aug. 13, 2010, now U.S. Pat. No. 8,917,696, which was the National Stage of International Application No. PCT/SE2009/050084, filed Jan. 28, 2009, which claims the benefit of U.S. Provisional Application No. 61/028,662, filed Feb. 14, 2008. The disclosures of each of these applications are incorporated herein by reference in their entirety.

TECHNICAL FIELD

The present invention relates to a method and arrangement in a telecommunication system, in particular to enable the UE to perform accurate measurements, estimations or demodulations.

BACKGROUND

UTRAN (Universal Terrestrial Radio Access Network) is a term identifying the radio access network of a UMTS (Universal Mobile Telecommunications System), wherein the UTRAN consists of Radio Network Controllers (RNCs) and NodeBs i.e. radio base stations. The NodeBs communicate wirelessly with mobile user equipments (UEs) and the RNCs control the NodeBs. The RNCs are further connected to the Core Network (CN). Evolved UTRAN (E-UTRAN) is an evolution of the UTRAN towards a high-data rate, low-latency and packet-optimised radio access network. Further as illustrated in FIG. 1, the E-UTRAN consists of radio base stations (eNBs) 12, and the eNBs are interconnected and further connected to the Evolved Packet Core network (EPC) 14. E-UTRAN is also being referred to as Long Term Evolution (LTE) and is standardized within the $3^{rd}$ Generation Partnership Project (3GPP). FIG. 1 also shows UEs 10 in communication with the eNBs 12.

E-UTRAN is a pure packet data designed cellular system, in which transmissions of user data in uplink and downlink always take place via shared channels. Orthogonal Frequency Division Multiplexing (OFDM) technology is used in the downlink, whereas DFT (Discrete Fourier Transform) based pre-coded OFDM is used in uplink. As similar to HSPA (High Speed Packet Access) in the UTRAN, the UE monitors physical downlink control channels (PDCCH) in order to access UE dedicated user data on the physical downlink shared channel (PDSCH) and the network assigns uplink scheduling grants to the UE on demand basis for uplink transmission via the physical uplink control channel (PUCCH) and the physical uplink shared channel (PUSCH). Error detection is provided on transport blocks and control payloads through CRC, and HARQ operations ensure efficient re-transmissions.

FIG. 2 illustrates mapping of downlink common reference signals for one, two and four antenna ports.

OFDM is a modulation scheme in which the data to be transmitted is split into several sub-streams, where each sub-stream is modulated on a separate sub-carrier. Hence, in OFDMA based systems, the available bandwidth is subdivided into several resource blocks prior to being transmitted. A resource block is used both for uplink and downlink and is defined in both the time and the frequency domain. According to the E-UTRAN standard, a resource block size is 180 KHz (comprising of 12 sub-carriers each with 15 KHz carrier spacing) and 0.5 ms (time slot) in frequency and time domains, respectively. The transmission time interval (TTI) comprises of 2 time slots, which correspond to 1 ms length in time. The radio frame is 10 ms long. The overall uplink and downlink transmission bandwidth can be as small as 1.4 MHz and as large as 20 MHz.

Each time slot comprises of N number of OFDM symbols as illustrated in FIG. 2 and a cyclic prefix (CP) is appended to each OFDM symbol to enable the mitigation of inter-symbol interference. The number of OFDM symbols 'N' per slot depends upon the cyclic prefix in use. In small cells typically normal CP (around 5 µs) is used whereas in larger cells extended CP (around 17 µs) is used. Therefore when normal CP is used more OFDM symbols can be used in a slot.

Each element in the time frequency resource grid for antenna port p is called a resource element 20, which is uniquely identified by the index pair (k,l) in a slot represented; $k^{th}$ sub-carrier and $l^{th}$ OFDM symbol as shown in FIGS. 1 and 2.

FIG. 2 further illustrates the resource elements 24 used for downlink common reference signal transmission for extended CP as specified in E-UTRA technical specification 36.211. The notation $R_p$ is used to denote a resource element used for common reference signal transmission on antenna port p. The common reference signals are also referred to as cell specific reference signal as opposed to UE specific reference signals which are also referred to as dedicated reference signals. As indicated in FIG. 2, some resource elements 20 denoted by crosses are not used for transmission on a specific antenna port.

Reference signals or pilot signals or pilot sequences or training sequences have similar meaning and are interchangeably used in literature. It is standardized set of signal sequences which are transmitted by the transmitter and are known a priori to the receiver. Their main objective is to assist the receiver to estimate the characteristics of radio channel, which especially varies over time due to user mobility.

The terms reference signal or reference symbol are also interchangeably used but they have similar meaning.

E-UTRAN utilizes multiple antennas techniques referred to as MIMO (Multiple Input Multiple Output) modes. Examples of such MIMO modes are precoding mode and beamforming mode. Precoding mode works with codebook-based transmission weights and utilizes common reference signal for channel estimation. A UE can determine a codebook index from the channel estimates and feed it back to the evolved NodeB (eNodeB). Beamforming mode works however with non-codebook based transmission weights, which requires in the downlink a dedicated reference signal that is precoded with the same transmission weights as the data and can be operated without any feedback of a codebook index. UE measurements for radio resource management, such as mobility management, are performed based on the common reference signals.

Regarding the dedicated reference signal pattern design for the beamforming mode, in one scenario where all the users in one cell are configured for beamforming mode, the shared channel is demodulated based on the dedicated reference signal. On the other hand, common channels such as broadcast channel or other common control channels such as PDCCH, which may be transmitted to all or a group of UEs, are typically sent over the entire cell. In other words they are not beamformed towards a particular UE. Hence, the UE needs to use common reference signals to demodulate all common channels. This means that the network has to transmit both dedicated and common reference signals in a cell supporting beamforming. The transmission of dedicated reference signals in addition to the common reference signals results in that the overall overhead of reference signals becomes quite high.

It is therefore desired to reduce this overhead when dedicated reference signals are transmitted to support beamforming in a cell. One way is to reduce the common reference signal density, e.g. to only keep the common reference signals in the same OFDM symbols as the common control channel while still keeping the common control channel demodulation performance good enough. In other scenarios where there are users configured for the precoding mode within one cell, common reference signals are required for both common control channel demodulation and the shared channel demodulation. Then it is preferred that the common reference signal is spread among the whole subframe, i.e. higher density.

The common reference signals are also used by the UE to perform neighbour cell measurements, which are used for taking mobility decisions such as cell reselection and handover. The neighbour cell measurements include, e.g. reference signal received power (RSRP) and reference signal received quality (RSRQ). However, the number of available reference signals is reduced if e.g. beamforming is used. An insufficient number of reference signals may adversely impact the neighbour cell measurement performance.

Moreover, LTE supports MBSFN (Multicast Broadcast Single Frequency Network) operation on the same carrier as unicast traffic. This means that a subset of the subframes is allocated to MBSFN transmission from multiple cells. In such subframes the common reference signal transmission is reduced and the common reference signals available for measurements are only transmitted in the first symbol of each subframe. In other normal unicast subframes, the reference signals from antenna port 0 and 1 for mobility measurements are transmitted in four different separated subframes.

In the current LTE it is desired to use as many reference signals as possible for neighbour cell measurements in order to achieve a good mobility management. For this purpose the serving cell can provide neighbour cell configuration indicators to the UE on a dedicated channel. These indicators can be used to indicate whether or not the neighbour cells have the same configuration as the serving cell and whether there are any MBSFN subframes at all. In this way the terminal will be able to use as many common reference signals as possible when performing the measurements.

SUMMARY

However, when considering a possible reduction of the common reference signals for more efficient support of beamforming with dedicated reference signals, there is a risk that different cells within the same area can use different MIMO modes with different common reference signal patterns. This can not be reflected by the existing indicators.

Thus the object of the present invention is to provide an improved method and arrangement for enabling a user equipment, UE, to perform more accurate measurements, estimations or demodulations. This is achieved by mapping beamforming information on common and shared channels which ensures that user equipments are able to make use of all the available reference signals that can be used in a cell for performing measurements, estimations or demodulations e.g. neighbour cell measurements. When performing those measurements, estimations or demodulations, it is desired to use as many signals as possible. This implies that the measurements, estimations or demodulations performed according to the present invention will be improved.

According to a first aspect of the present invention a method in a network node of a cellular communication network for enabling a user equipment, UE, to perform measurements, estimations or demodulations is provided. In the method, MIMO mode settings associated with the network node is determined. It is then indicated on a downlink common or shared channel, the determined MIMO mode settings to the UE. The indicated MIMO mode settings explicitly or implicitly indicate available common reference signals and/or dedicated reference signals to be used for said UE measurements, estimations or demodulations. It should be noted that the dedicated reference signals are used for beamforming since they are UE specific which implies that they are used by the UE for performing channel estimation for the received beam as well as some sort of beamforming specific measurements e.g. channel quality indicator (CQI) which is used for scheduling. The common reference signals may be used for measurements, estimation and demodulation.

According to a second aspect of the present invention, a method in a UE for enabling the UE to perform measurements, estimations or demodulations is provided. In the method, an indication is received, on a downlink common or shared channel, of determined MIMO mode settings associated with a network node. The indicated MIMO mode settings explicitly or implicitly indicate available common reference signals and/or dedicated reference signals to be used for said UE measurements, estimations or demodulations. Measurements, estimations or demodulations based on said received indication are performed accordingly.

According to a third aspect of the present invention a network node of a cellular communication network for enabling a user equipment, UE, to perform measurements, estimations or demodulations is provided. The network node comprises a first unit configured to determine MIMO mode settings associated with the network node. It further comprises a second unit configured to indicate, on a downlink common or shared channel, the determined MIMO mode settings to the UE, wherein the indicated MIMO mode settings explicitly or implicitly indicate available common reference signals and/or dedicated reference signals to be used for said UE measurements, estimations or demodulations.

According to a fourth aspect of the present invention a UE for performing measurements, estimations or demodulations is provided. The UE comprises a receiver configured to receive an indication, on a downlink common or shared channel, of determined MIMO mode settings associated with a network node. The indicated MIMO mode settings explicitly or implicitly indicate available common reference signals and/or dedicated reference signals to be used for said UE measurements, estimations or demodulations. The UE further comprises a unit configured to perform measurements, estimations or demodulations based on said received indication.

Advantages with the embodiments of the present invention are that beamforming information on the common control channel is transmitted, which implies that:

The UE is capable to detect the common reference signal pattern that is used in the monitored cell at very early stage.

Thus, the UE can make full use of all the reference signals to demodulate downlink control signaling such as PDCCH.

The UE is capable to detect (or is informed about) the common reference signal pattern that is used in the monitored cell at very early stage. Thus the UE can make full use of all the reference signals to perform measurement for difference usages, e.g. for handover.

The UE is capable to detect whether a cell will work on beamforming mode or not, which implies that the UE knows what kind of feedback is needed.

DETAILED DESCRIPTION

Figure 1:
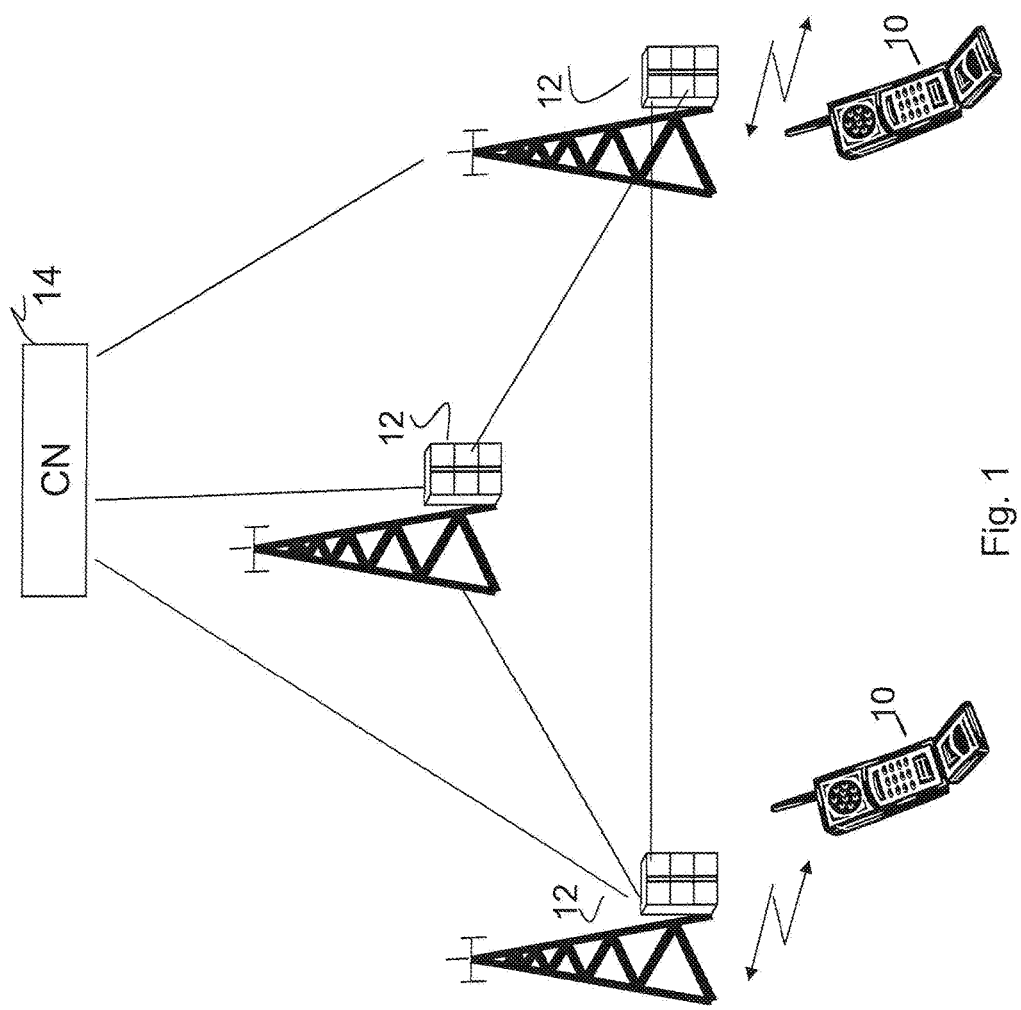
FIG. 1 illustrates a mobile telecommunication network wherein the embodiments of the present invention may be implemented.
Figure 2:
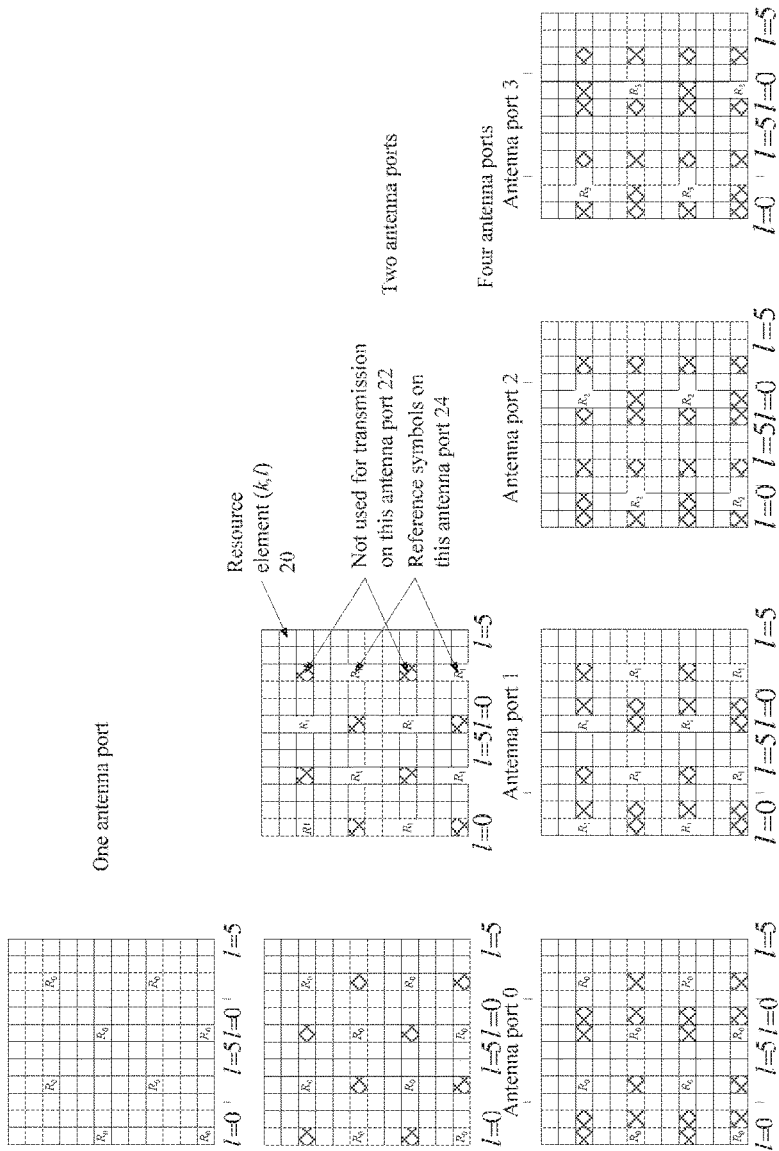
FIG. 2 illustrates mapping of downlink common reference signals (extended cyclic prefix) according to prior art.

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means, units and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

If a user equipment (UE) always assumes the worst scenario, i.e. the reduced number of common reference signals in all cells, the measurement performance will be deteriorated implying one or more of the following reasons: poor measurement accuracy, longer measurement period, etc. The measurement performance degradation due to the reduced reference signals becomes especially pronounced for user equipments at higher speed. In such cases the bias of the measurement reports becomes large such that the measurement quantity that is reported by the UE becomes less reliable. The overall impact is that this will eventually affect the mobility performance, e.g. handover performance, if the serving cell operates in pure beamforming mode and at least one of the neighbouring cells uses the precoding mode (or vice versa). In that case, the straight forward way for performing the UE measurements is to rely on the more sparse availability of common reference signal which occurs in the beamforming mode.

Similar problems as described above also exist for basic channel estimation: The channel estimates based on common reference signals may be used for demodulation of control signaling and, depending on the MIMO mode definition, demodulation of data channels, channel quality estimation, etc. Without knowing the common reference signal pattern, demodulation of basic downlink control signaling (such as physical broadcast channel (PBCH), PCFICH, PHICH and PDCCH detection) can only rely on a more sparse common reference signal, which is known to always exist independent of the MIMO mode. In the end, this leads to worse performance in the precoding mode where more reference signals are available for neighbour cell measurements. In addition, beamforming mode and precoding mode require different feedbacks from the UE. Hence, MIMO mode information is needed for the UE to prepare the correct feedback type.

In this specification, a reference signal is any sequence of signals which is known to the UE a priori i.e. the pattern may be generally specified in the standard. The reference signals assist the UE in performing various tasks: channel estimation, measurements, determining cell timing etc. As stated above, there are two main types of reference signals: common and dedicated reference signals. The common reference signals are cell specific and common to all users in a cell and are transmitted regardless whether users are served or not. They are used for channel estimation and for measurements (e.g. cell specific measurement i.e. neighbour cell measurement). Dedicated reference signals are user specific i.e. activated when user is active. The dedicated reference signals are used for beamforming which implies that they are used by the UE for performing channel estimation for the received beam as well as some sort of beamforming specific measurements e.g. channel quality indicator (CQI) which is used for scheduling. So if the network signals dedicated reference symbols or its identity then the UE can find out the available common reference symbols because dedicated reference symbols plus common reference symbols is constant.

The embodiments of the present invention ensure that the UEs are able to make use of all the available reference signals that can be used in a cell for performing measurements and estimations, e.g. performing neighbour cell measurements.

Hence, the present invention relates to methods and arrangements for mapping or signalling MIMO mode information, e.g. information whether beamforming is used or not and/or information associated with the common reference signal pattern, such as the index of the pattern or the pattern itself with the smallest number of available common reference signals (i.e. with the highest number of dedicated reference signals). The MIMO mode information is sent on a common or shared channel or any type of appropriate broadcast or multicast channel, e.g. PBCH. It is also possible to map such information on the synchronization channel (PSS/SSS), on the dedicated broadcast channel (D-BCH), which is mapped on a shared channel as in LTE, or on a common reference signals. It is possible to map the MIMO mode information on the common reference symbols since certain minimum portion or number of common reference signals will always be sent regardless of the density of dedicated reference signals. The presence of minimum set of common reference signal is required for demodulating common channels and for neighbour cell measurements as explained in more detail below. Thus when MIMO mode information is mapped on common reference signal it may either be in the form of a single bit indicating the presence or absence of the dedicated reference signal, or it may be more detailed information (e.g. 4 bits) containing the index or identity of the dedicated reference signal pattern present in that cell.

Figure 3:
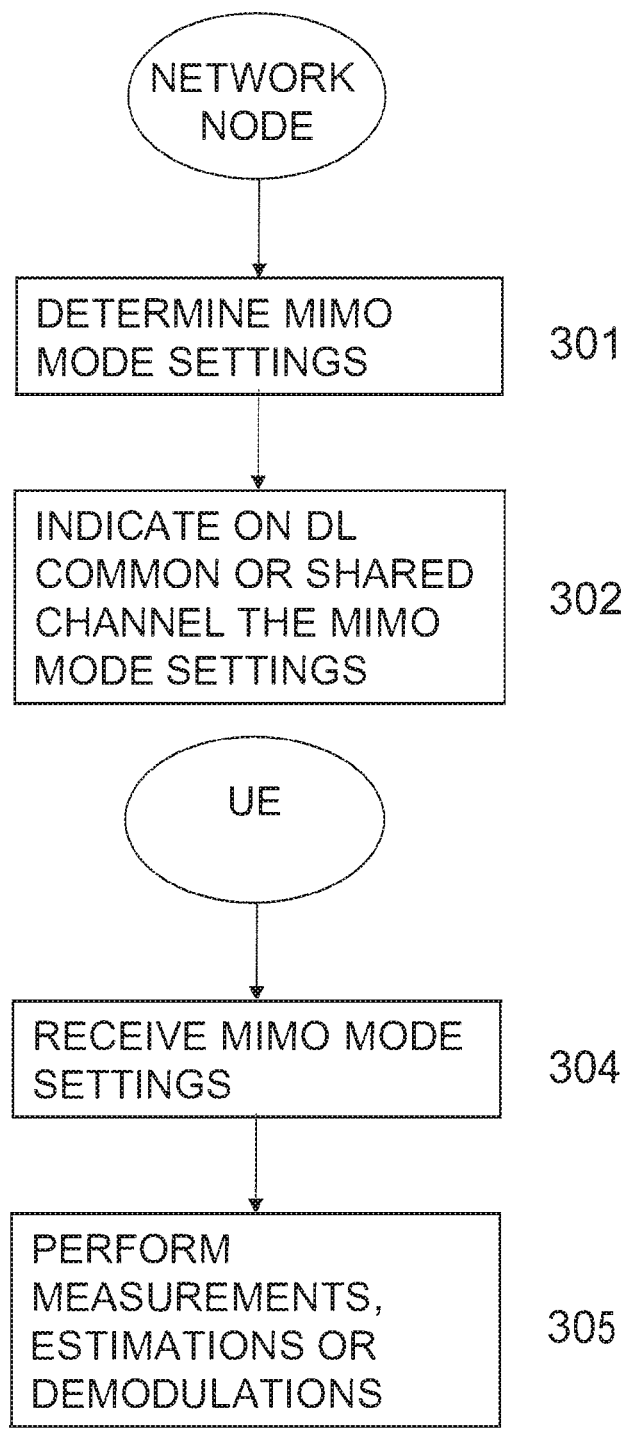
FIG. 3 illustrates flowcharts of methods according to embodiments of the present invention.

In accordance with the present invention as illustrated in the flowchart of FIG. 3, the network node, e.g. the eNode B, determines 301 MIMO mode settings associated with the network node and indicates 302, on a downlink common or shared channel, the determined MIMO mode settings to a UE. The UE may be located in a cell served by said network node or in a neighbouring cell. The indicated MIMO mode settings explicitly or implicitly indicate available common reference signals to be used for measurements, estimations or demodulation. The measurements, estimations or demodulation may be neighbour cell measurement, channel estimation, demodulation and CQI estimation.

Accordingly, the UE receives 304 an indication, on a downlink common or shared channel, of the determined MIMO mode settings from a network node, wherein the indicated MIMO mode settings explicitly or implicitly indicate available common reference signals and/or dedicated reference signals to be used for said UE measurements, estimations or demodulations. Then the UE can perform 305 measurements, estimations or demodulations based on said received indication.

According to a first embodiment of the present invention, the MIMO mode information is sent from the serving cell, i.e. the network node serving the UE, and the MIMO mode information comprises information whether the serving cell uses beamforming or not. In addition, the serving cell may also indicate whether beamforming is used in a neighbouring cell. Thus one bit may be used to carry this information. In this case the UE may assume the worst case scenario in terms of the common reference signal. This means in case more than one dedicated reference signal patterns are possible in a cell the UE will have to assume that all dedicated patters are activated.

According to a second embodiment of the present invention, the MIMO mode information is sent from the serving cell, i.e. the network node serving the UE as in the first embodiment. However, in the second embodiment, the MIMO mode information comprises in addition to the information whether beamforming is used or not, information of the common reference signal pattern with the smallest number of available common reference signals. In case of only two common reference signal patterns, one bit is sufficient to indicate which one is used in a cell. Otherwise, N bits signaling in e.g. PBCH maps to $2^N$ types of common reference signal patterns. This will indicate to the UE which one of the possible $2^N$ common reference signal patterns is used in a cell. As the exact reference signal pattern (or details of such pattern) will be standardized it is sufficient for the network to signal the index or identity of the reference signal pattern used in that cell.

In the first and second embodiments, PBCH may be used to carry the MIMO mode information for the UE in idle mode since the UE does not read the PDSCH in idle mode. Similarly PDSCH may be used to carry the MIMO mode information when the UE is in connected mode since typically UE does not read PBCH in connected mode.

According to a third embodiment, a network node which is not the serving node of the UE may map MIMO mode information on a pilot signal sent on the synchronization channel (SCH). The SCH carries synchronization sequences to the UE for acquiring frequency, time and cell synchronization. In LTE the SCH comprises a primary synchronization sequence (PSS) and a secondary synchronization sequence (SSS). The PSS is used to acquire OFDM symbol boundary. Thus more specifically the MIMO mode information can be mapped on SSS. In this way the UE can receive information whether the neighbouring cell uses beamforming or not during the cell synchronization procedure. As an alternative, the MIMO mode information can also be mapped on the common reference signals i.e. on one or on a few bits sent on the part of common reference signals, which are always present.

Furthermore, according to a fourth embodiment, the UE can read the MIMO mode information on a common channel, e.g. on the PBCH, sent from a neighbouring cell.

According to a fifth embodiment of the present invention, the third and fourth embodiments are combined. That implies that a UE first retrieves information from the pilot signal on the SCH of a neighbouring cell and if the UE can conclude that beamforming is being used by that neighbouring cell, then the UE reads on the PBCH from said neighbouring cell to retrieve more detailed information associated with the MIMO mode such that the UE can determine the available common reference signals to be used for neighbour cell measurements by the UE.

Before performing the neighbour cell measurement from a cell (e.g. by means of an intra-frequency measurement, inter-frequency measurement, or even inter-RAT measurement), the UE can either detect the PBCH (or any common channel carrying beamforming information) to retrieve the MIMO-mode related information (i.e. common reference signal pattern index) or can even be provided with this information by means of higher layer signaling together with other information such as the frequency on which to measure.

In addition, it is also possible to indicate the available RS patterns that are used in the neighbouring cells (for instance, 1 bit of RS pattern difference to indicate whether the patterns in neighbouring cells are the same as in the serving cell). The serving cell can acquire MIMO-mode related information of the neighbor cells via backhaul communication between itself and the neighbor cells. For instance if same MIMO is used in the serving and neighbor cells then the serving cell can indicate using 1 bit that the same RS pattern is used in the neighbor cells.

Based on this acquired information the UE can perform the measurements based on all the available reference signals that are used in that cell according to the embodiment of the present invention. The UE can basically adapt the neighbour cell measurement filtering method or algorithm according to the available reference signals in a cell. When beamforming is used there will be fewer common reference signals for measurements. This means measurements will incorporate more error compared to the scenario where a full set of common reference signals are transmitted. The measurements are done over a certain measurement period to achieve the desired accuracy e.g. 200 ms when all common reference signals are available. In case of reduction of common reference signals, the default measurement period may not be sufficient and would instead typically lead to measurement error or bias i.e. measured value would typically be underestimated. The information whether beamforming is used or not can assist UE to adapt the measurement period to compensate the bias or error of the measured value. A longer measurement period would allow the UE to obtain enough measurement samples to achieve the desired measurement accuracy. For instance, in one scenario when beamforming is used, the UE can use more time domain filtering (i.e. a longer measurement period such as 400 ms or even longer) to ensure that the bias is reduced. In another scenario, when no beamforming is used in the cell, the UE can use shorter time domain filtering or fewer samples or a shorter measurement period such as the default value (e.g. 200 ms). This means that in the latter case the measurement will be done more quickly and can reduce processing times in the UE as well. This will also save UE power in DRX mode since fewer samples are needed compared to the worst case scenario i.e. under the assumption that the beamforming is employed in all cells.

In accordance with embodiments described above, the MIMO mode information is sent on the PBCH (physical BCH) since it is easy for the UE to read the PBCH of the neighbour cell without much complexity. In this scenario the UE can read this information just after the cell search process i.e. after that it has identified this particular neighbour cell.

In case MIMO mode information is mapped on the pilot channel on the synchronization channel (PSS/SSS) according to the third embodiment, the UE can acquire this information already during the neighbour cell search procedure. On the other hand, when the MIMO mode information is mapped on the set of common reference signals, which are always sent, the UE can find this information during the neighbour cell measurement itself or prior to it. If such information is mapped on D-BCH, which in turn is sent via normal shared channel, the UE will also read it to acquire MIMO mode information after the cell search procedure.

In addition, the UE may assume that a certain MIMO mode setting is used. Hence, the network may or may not signal the MIMO mode pattern information. The UE then performs measurements according to the assumed common reference signal pattern. The assumption can be based on some sort of autonomously detection of the presence of the common reference signal pattern. For instance, the UE can check various possible hypotheses by correlating over all possible common reference signal patterns and locks on to the one which is found to be the most suitable. The UE may then also signal the measurements as well as the assumed setting (i.e. index or identity of setting) used for measurements to the network. If the signaled setting matches with the one actually used by the network then no compensation is required. On the other hand if there is a mismatch then the network can compensate for any errors by applying an appropriate offset to the reported results.

Figure 4:
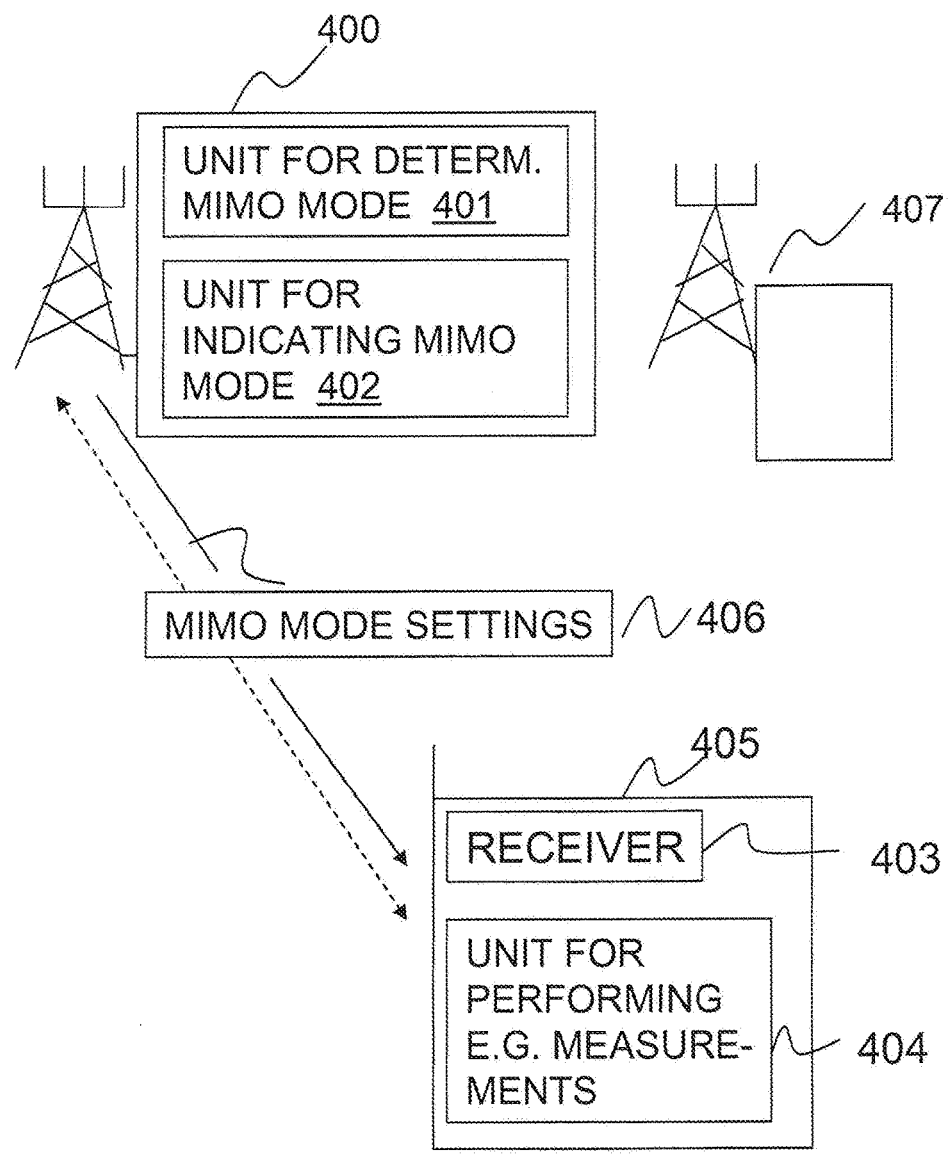
FIG. 4 illustrates a UE and a network node according to embodiments of the present invention.

FIG. 4 illustrates a UE 405 which is connected to radio base station 400. The radio base station denoted 407 is serving a neighbouring cell. With reference to FIG. 4, the radio base station 400 (also referred to as a network node) of a cellular communication network according to embodiments of the present invention enables a UE 405, to perform more accurate measurements, estimations or demodulations, since all available common reference signals and/or dedicated reference signals can be used. The network node 400 comprises a first unit 401 configured to determine MIMO mode settings associated with the network node. It further comprises a second unit 402 configured to indicate, on a downlink common or shared channel, the determined MIMO mode settings 406 to the UE. The indicated MIMO mode settings 406 explicitly or implicitly indicate available common reference signals and/or dedicated reference signals to be used for said UE measurements, estimations or demodulations. As stated above, the UE measurements, estimations or demodulations comprise at least one of: neighbour cell measurement, channel estimation, demodulation and CQI estimation. The radio node may be a radio base station as illustrated in FIG. 4.

Furthermore, the UE comprises according to the present invention (in addition to standard UE components such as RF components, different functionalities implemented by software or hardware means) a receiver 403 configured to receive an indication, on a downlink common or shared channel, of the determined MIMO mode settings 406, wherein the indicated MIMO mode settings 406 explicitly or implicitly indicate available common reference signals and/or dedicated reference signals to be used for said UE measurements, estimations or demodulations. The UE further comprises a unit 404 configured to perform measurements, estimations or demodulations based on said received indication.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method in a network node of a cellular communication network of enabling a user equipment (UE) to perform measurements, estimations or demodulations, the method comprising:
   determining Multiple Input Multiple Output (MIMO) mode settings associated with the network node; and
   indicating, on a downlink common or shared channel, the determined MIMO mode settings to the UE,
   wherein the indicated MIMO mode settings explicitly or implicitly indicate available common reference signals or dedicated reference signals available for said UE measurements, estimations or demodulations, and
   wherein the determined MIMO mode settings are indicated in a common reference signal via one or both of:
      a single bit indicating a presence or absence of dedicated reference signals, and
      a plurality of bits together containing an index or an identity of the available dedicated reference signals.

2. The method of claim 1, wherein the UE measurements, estimations or demodulations comprise are selected from the group consisting of neighbor cell measurement, channel estimation, demodulation, and Channel Quality Indicator (CQI) estimation.

3. The method of claim 1, wherein the indicated MIMO mode settings indicate whether beamforming is used or not.

4. The method of claim 1, wherein indicating the determined MIMO mode settings further comprises indicating the MIMO mode used in at least one neighbor cell.

5. The method of claim 1, wherein the indicated MIMO mode settings further indicate the bit pattern of the MIMO setting with the smallest number of available common reference signals.

6. The method of claim 1, wherein the network node is the serving node for the UE.

7. The method of claim 6, wherein the downlink common or shared channel is a Broadcast Channel (BCH).

8. The method of claim 6, wherein the downlink common or shared channel is a Physical Downlink Shared Channel (PDSCH).

9. The method of claim 4, wherein the indicated MIMO mode settings indicate whether the MIMO mode settings of the neighboring cell differ or not from the MIMO mode settings of the serving cell.

10. The method of claim 1, wherein the network node is not the serving node for the UE.

11. The method of claim 1, wherein the downlink common or shared channel is a Physical Broadcast Channel (PBCH).

12. The method of claim 10, wherein the downlink common or shared channel is a Synchronization Channel (SCH).

13. The method of claim 1, wherein the indication of available common reference signals to be used for neighbor cell measurements by the UE is transmitted via higher layer signaling.

14. A method in a user equipment (UE) of enabling the UE to perform measurements, estimations or demodulations, the method comprising:
- receiving an indication, on a downlink common or shared channel, of determined Multiple Input Multiple Output (MIMO) mode settings associated with a network node,
- wherein the indicated MIMO mode settings explicitly or implicitly indicate available common reference signals or dedicated reference signals available for said UE measurements, estimations or demodulations, and
- wherein the indication is received in a common reference signal, the indication comprising one or both of:
  - a single bit indicating a presence or absence of dedicated reference signals, and
  - a plurality of bits together containing an index or an identity of the available dedicated reference signals; and
- performing measurements, estimations, or demodulations based on said received indication.

15. The method of claim 14, wherein the UE measurements, estimations or demodulations are selected from the group consisting of: neighbor cell measurement, channel estimation, demodulation and Channel Quality Indicator (CQI) estimation.

16. The method of claim 14, wherein the indicated MIMO mode settings indicate whether beamforming is used or not.

17. The method of claim 14, wherein the UE further receives the MIMO mode used in at least one neighbor cell.

18. The method of claim 14, wherein the indicated MIMO mode settings further indicate the bit pattern of the MIMO setting with the smallest number of available common reference signals.

19. A network node of a cellular communication network for enabling a user equipment (UE) to perform measurements, estimations, or demodulations, the network node comprising:
- a first unit configured to determine Multiple Input Multiple Output (MIMO) mode settings associated with the network node; and
- a second unit configured to indicate, on a downlink common or shared channel, the determined MIMO mode settings to the UE,
- wherein the indicated MIMO mode settings explicitly or implicitly indicate available common reference signals or dedicated reference signals available for said UE measurements, estimations or demodulations, and
- wherein the determined MIMO mode settings are indicated in a common reference signal via one or both of:
  - a single bit indicating a presence or absence of dedicated reference signals, and
  - a plurality of bits together containing an index or an identity of the available dedicated reference signals.

20. The network node of claim 19, wherein the UE measurements, estimations or demodulations are selected from the group consisting of: neighbor cell measurement, channel estimation, demodulation and Channel Quality Indicator (CQI) estimation.

21. The network node of claim 19, wherein the indicated MIMO mode settings indicate whether beamforming is used or not.

22. The network node of claim 19, wherein the second unit is further configured to indicate the MIMO mode used in at least one neighbor cell.

23. The network node of claim 19, wherein the indicated MIMO mode settings further indicate the bit pattern of the MIMO setting with the smallest number of available common reference signals.

24. The network node of claim 19, wherein the downlink common or shared channel is a Broadcast Channel (BCH).

25. The network node of claim 19, wherein the downlink common or shared channel is a Physical Downlink Shared Channel (PDSCH).

26. The network node of claim 22, wherein the indicated MIMO mode settings indicate whether the MIMO mode settings of the neighboring cell differ or not from the MIMO mode settings of the serving cell.

27. The network node of claim 19, wherein the downlink common or shared channel is a Physical Broadcast Channel (PBCH).

28. The network node of claim 19, wherein the downlink common or shared channel is a Synchronization Channel (SCH).

29. A user equipment (UE) operative to perform measurements, estimations or demodulations, comprising:
- a receiver configured to receive an indication, on a downlink common or shared channel, of determined MIMO mode settings associated with a network node,
- wherein the indicated MIMO mode settings explicitly or implicitly indicate available common reference signals or dedicated reference signals available for said UE measurements, estimations or demodulations, and
- wherein the indication is received in a common reference signal, the indication comprising one or both of:
  - a single bit indicating a presence or absence of dedicated reference signals, and
  - a plurality of bits together containing an index or an identity of the available dedicated reference signals; and
- a unit configured to perform measurements, estimations or demodulations based on said received indication.

* * * * *